SOLID-STATE SWITCHING DEVICE INCLUDING METAL-SEMICONDUCTOR PHASE TRANSITION ELEMENT AND METHOD FOR CONTROLLING SAME

Filed Feb. 13, 1969 3 Sheets-Sheet 1

INVENTOR
JUN-ICHI UMEDA

BY Craig, Antonelli, Stewart & Hill
ATTORNEYS

INVENTOR
JUN-ICHI UMEDA

BY Craig, Antonelli, Stewart & Hill
ATTORNEYS

INVENTOR
JUN-ICHI UMEDA

BY Craig, Antonelli, Stewart & Hill
ATTORNEYS 3,543,104
Patented Nov. 24, 1970

3,543,104

SOLID-STATE SWITCHING DEVICE INCLUDING METAL-SEMICONDUCTOR PHASE TRANSITION ELEMENT AND METHOD FOR CONTROLLING SAME

Jun-Ichi Umeda, Kodaira-shi, Japan, assignor to Hitachi, Ltd., Tokyo, Japan, a corporation of Japan Filed Feb. 13, 1969, Ser. No. 798,905
Claims priority, application Japan, Feb. 14, 1968, 43/9,268
Int. Cl. H01l 15/00
U.S. Cl. 317—234 5 Claims

ABSTRACT OF THE DISCLOSURE

A solid-state switching device including a metal-semiconductor phase transition element which exhibits the first order phase transition and in which there coexist both a metallic phase and a semiconductive phase at and in the vicinity of a particular temperature. Such a device can perform an electrical switching operation by conditioning the element so as to have both a metallic phase and a semiconductive phase simultaneously and by applying to the element in a reverse bias direction such a control electric field that will render either one of the metallic and semiconductive phases predominant in the element so that the element may be either conductive or non-conductive depending upon the applied control electric field.

BACKGROUND OF THE INVENTION

Field of the invention

The present invention relates to solid-state switching devices including a metal-semiconductor phase transistion element and methods for controlling such switching device.

More particularly, such metal-semiconductor phase transition element consists of a solid material in which there coexist a metallic phase and a semiconductive phase at a particular temperature and which shows the first order phase transition either from a metallic phase to a semiconductive phase or vice versa. A control electric field is applied in a reverse bias direction to the element so that either one of the metallic and semiconductive phases may be predominant in the element, whereby the device is conductive or non-conductive depending upon the applied control electric field. In the present specification the term "metal-semiconductor phase transistion material" is used to mean solid-state materials in which there coexist a metallic phase and a semiconductive phase at a particular temperature proper to each of the solid-state materials and which exhibits the first order phase transition either from a metallic phase to a semiconductive phase or vice versa. Up to the present, as such metal-semiconductor phase transistion material, there have been known VO, $V_2O_3$, $VO_2$ and $TiO_3$.

Generally, when a material system possesses effectively available energy which is reversible in association with the environment, such energy is collectively called "free energy." Assuming that delivery of heat $\delta q$, energy of work done mechanically $\delta W$ ($=-pdV$) and energy $\delta u$ takes place reversibly between one system and its environment, a change of the total energy of the system is defined by the second law of thermodynamics for a reversible change of energy, $\delta q=Tds$, and is therefore expressed by $$dE=\delta q+\delta W+\delta u=Tds-udV+\delta u$$

where

T: absolute temperature
$dS$: differential variation of entropy away from the equilibrium state
$\delta p$: differential variation of pressure away from the equilibrium state
$dV$: differential variation of volume away from the equilibrium state
$\delta u$: sum of energy received from the exterior except for energy of work done mechanically and of entropy term Accordingly, effective energy available from such system undergoing a reversible change is $\delta u$, which is given by $$-\delta u=-(dE+pdV-TdS)$$

The effective energy is, under a constant pressure and at a constant temperature, equal to $$-\delta u=-[de+d(pV)-d(TS)]=-d[E+pV-TS]=-d(H-TS)=-dG$$

so that the thermodynamical characteristic function $G$ ($=H-TS$) is represented by Gibbs' free energy $\varphi$. A "deviation" from a stable state of a material system can be represented in terms of free energy.

Meanwhile, in a system in which coexist two kinds of phases A and B, if the predominant phase is changed from A to phase B due to a change in temperature T or in pressure $p$, the corresponding change in the Gibbs' energy $\varphi$ is given by $$\varphi_B(T,p)-\varphi_A(T,p)=\left[\left(\frac{\partial}{\partial p}dp+\frac{\partial}{\partial T}dT\right)G_B-\left(\frac{\partial}{\partial p}dp+\frac{\partial}{\partial T}dT\right)G_A\right]+\left[\left(\frac{\partial}{\partial p}dp+\frac{\partial}{\partial T}dT\right)^2G_B-\left(\frac{\partial}{\partial p}dp+\frac{\partial}{\partial T}\partial T\right)^2G_A\right]+\cdots$$

If all the terms except the first one of the right-hand member of the above formula are zero, such phase transition is called the first order phase transition while if all the terms except the second one of the right-hand member of the above formula are zero, such phase transition is called the second order phase transition. In general, since the following relation is established $$\left(\frac{\partial G}{\partial T}\right)_p=S$$

(S: entropy.)

$$\left(\frac{\partial G}{\partial p}\right)_T=V$$

(V: volume.)

At the first order phase transition, absorption and emission of latent heat equal to $Q=T(S_B-S_A)$ and a change of volume equal to $(V_B-V_A)$ will take place.

As an example of a material which causes the first order phase transition, there is known $VO_2$. When the first order phase transition occurs in $VO_2$ which is 29.5 A.$^3$ in volume, the corresponding volume change is of the order of 0.1 A.$^3$ and the latent heat amounts to 750 cal./mol. Since a phase transition within a material exhibiting the first order phase transition is accompanied by absorption and emission of latent heat, such phase transition is generally considered to proceed along with a distinct boundary layer at a particular temperature. In a solid phase-solid phase transition within a material, such a boundary layer is located at a certain position within the material corresponding to a quasi-stable state unless lattice distortion is too large. And, the location of the boundary layer is controllable even by a small extent of external conditions such as a change of heat, externally applied distortion, etc.

As the materials such as vanadium oxides VO, $V_2O_3$ and $VO_2$ and titanium oxide $TiO_3$ possess particular temperatures at which metallic phase-semiconductive phase transition takes place, application of temperature variations passing such particular temperatures to the materials makes either one of a metallic phase and a semiconductive phase predominant in the materials depending upon the applied temperature variations so that the conductivity $\sigma$ of the materials is abruptly changed. Further, upon the phase transition the crystal structure of such a material is also changed.

Description of the prior art

Such materials as have been described are, therefore, capable of being used as a switching element due to the abrupt change in the conductivity when the temperature of an element made of one of such materials is changed between a temperature below the transition point proper to the material and a temperature above the transition point. Thus, heretofore, such materials have been used as a switching element in one of the following separate ways:

(a) changing the temperature of the element itself to alternatively above and below the phase transition temperature of the element, and (b) changing the voltage to be applied to the element.

In the first way of operation, a temperature variation has to be given to the element from the environment, so that it is necessary that the heat capacity of the element itself and that of a heat bath be large and the switching time must be no shorter than $10^{-1}$ sec. due to necessary thermal conduction from the heat bath to the element.

Meanwhile, in the second way of operation, also the switching time must be longer than $10^{-4}$ sec. due to the heat capacity of the current passing portion of the element and absorption and emission of latent heat produced along with the phase transition in the element. In addition, when the metallic phase is predominant in the element, i.e., when the element has a large conductivity and is therefore in its "on" state, the element has to be maintained at a temperature higher than a phase transition temperature $T_c$, which requires a continuous supply of power so much.

SUMMARY OF THE INVENTION

An object of the present invention is to provide a solid-state switching device having a high speed switching operation and including a "metal-semiconductor phase transition material" element.

Another object of the present invention is to provide a method for controlling such a solid-state switching device so as to perform a switching operation by effecting a phase transition to either one of the phases in the element in a short period of time.

In accordance with the present invention, the "metal-semiconductor phase transition material" element constituting a switching device is supplied with a reverse bias electric field and is further given either a temperature gradient or an impurity concentration gradient therein so that the switching operation can be performed at a high speed and with a small power, the element being composed of a material which exhibits the first order phase transition between a metallic phase and a semiconductive phase.

BRIEF DESCRIPTION OF THE DRAWINGS

FIGS. 2(*a*) and 2(*b*) are diagrams for illustrating states of Schottky barriers in a material in which coexist a metallic and a semiconductive phase and which causes the first order phase transition, in the state of FIG. 2(*a*) no external electric field being applied to the material while in the state of FIG. 2(*b*) an external electric field being applied to the material.

DESCRIPTION OF THE PREFERRED EMBODIMENTS

Figures 1, 2A, 2B, 3:
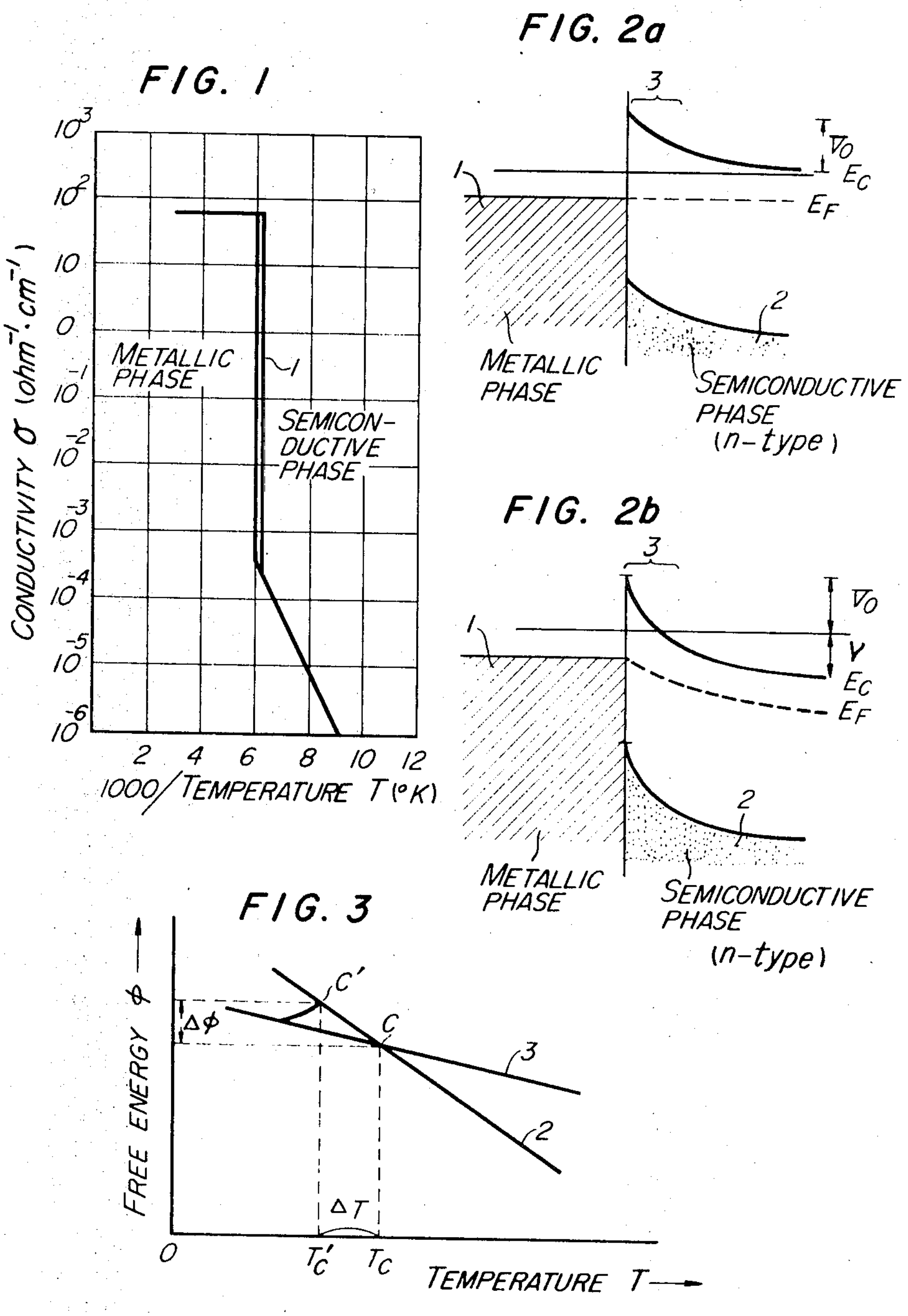
FIG. 1 shows temperature-conductivity characteristics of a material in which coexist a metallic phase and a semiconductive phase and which causes the first order phase transition.
FIG. 3 shows characteristic curves of the free energy with respect to the temperature of a material in which coexist a metallic and a semiconductive phase and which causes the first order phase transition.

As has been described above, metal-semiconductor phase transition materials such as VO, $V_2O_3$, $VO_2$ and $TiO_3$ belong to the "metal-semiconductor phase transition material." An example of the graphical illustration of such a material given in FIG. 1, wherein the coordinate indicates the conductivity $\sigma$ in ohm$^{-1}$.cm.$^{-1}$ and the abscissa indicates 1000 times the reciprocal of the temperature T in ° K. (1000/° K.). As shown by curve 1, the transition point $T_c$ exists in the vicinity of 66° K., and in a range higher than $T_c$ the conductivity $\sigma$ is relatively large (metallic phase) while in a range lower than $T_c$ the conductivity is relatively low (semiconductive phase).

In view of the above, theoretical explanation will first be given before the description of concrete examples for a better understanding of the invention.

In an element consisting of a metal-semiconductor phase transition material there exists such a high field intensity layer 3 that has a potential difference $V_q$, as shown in FIG. 2(*a*), due to the fact that the work function $\varphi_m$ of a metallic phase 1 and the work function $\varphi_s$ of a semiconductive phase 2 is different. When the semiconductive phase 2 is of an n-type as in the case of the illustration $\varphi_m < \varphi F$ while when the semiconductive phase 2 is of a p-type $\varphi_m > \varphi F$ ($\varphi$F: Fermi level of energy). If an external voltage $\nu$ is applied to the element in a reverse bias direction, the potential difference across the high intensity field layer 3 is changed to $(V_0+\nu)$, as shown in FIG. 2(*b*).

In the state shown in FIG. 2, the electric field intensity $E_0$ in the layer 3 is defined by $$E_0\sqrt{\frac{2K}{eN}}\cdot\sqrt{V_0} \qquad (1)$$

where:

K: permittivity of metallic phase 2
N: concentration of effective electrons (or holes)
*e*: electronic charge and if a reverse bias voltage $\nu$ is externally applied to the element, the electric field intensity E in the layer 3 will be $$E=\sqrt{\frac{2K}{eN}}\cdot\sqrt{V_0+\nu}=E_0\left(1+\sqrt{\frac{\nu}{V_0}}\right) \qquad (2)$$

so that, briefly, by applying an external voltage $v$ of the order of volts in the reverse bias direction an intense electric field E nearly as high as $10^7$ v/cm. is established at the boundary between the metallic phase and the semiconductive phase. Meanwhile, the free energy $\varphi$ of a material system having an internal energy F at a temperature T is defined by $$\varphi=F-T\cdot S \quad (3)$$

where S represents entropy. Referring to FIG. 3 in which the characteristic curves 2 and 3 indicate the relation between the free energy $\varphi$ and the temperature T with respect to the metallic phase and the semiconductive phase respectively, at the intersection C of the two curves the free energy of the metallic phase is equal to that of the semiconductive phase, so that the temperature corresponding to this intersection is the transition point $T_c$ where there coexist such metallic and semiconductive phases. Now supposing that there is formed such a high electric field intensity layer at the boundary between the metallic phase and the semiconductive phase as described above, the internal energy F is increased by an amount of dielectric energy $(KE^2/2)$ at the high intensity electric field layer, resulting in an increase in the free energy as much as $\Delta\varphi(=KE^2/2)$. Thus, the coexisting point at which the metallic and semiconductive phases coexist moves from point C to point C' with the transition point $T_c$ being lowered to $T_c'$ accordingly. Assuming that the free energy of the semiconductive phase and the free energy of the metallic phase are $\varphi_s(T)$ and $\varphi_m(T)$ respectively when no electric field exists and the electric field intensity at the boundary facing the semiconductive phase is E, the following relation is established:

$$\varphi_s(T)+\tfrac{1}{2}KE^2=\varphi_m(T) \quad (4)$$

so that a boundary defined by $\varphi_s(T)<\varphi_m(T)$ always exists in the element. Therefore, application of an external reverse bias voltage to the metallic phase-semiconductive phase boundary causes the boundary to move so as to have the transition point lowered. The temperature T of the boundary is theoretically calculated by $$\Delta T=\tfrac{1}{2}KE^2\cdot\frac{T_c\cdot V_m}{Q} \quad (5)$$

where:

$T_c$: transition point of temperature
$V_m$: volume per unit mol of the material
Q: latent heat per unit mol of the material The temperature variation $\Delta t$ of the transition point $t$ due to application of a reverse bias voltage $v$ is $$\Delta t=t-t_0=t_0\cdot\frac{v}{V_0} \quad (6)$$

where $$t_0=\tfrac{1}{2}KE_0\cdot\frac{T_c\cdot V_m}{Q}$$

Taking as an example $VO_2$, various constants are $K=26\times0.885\times10^{-11}$ coulombs/V.·m.
$T_c=340°$ K., $V_0\simeq0.5$ v.
$e=1.6\times10^{-19}$ coulombs, $N\simeq3\times10^{24}$ mm.$^{-3}$ and then $E_0\simeq4.5\times10^7$ v./m. Also, by substituting $V_m=3.54\times10^{-5}$ m.$^3$/mol and $Q=750$ cal./mol $t_0$ approximately amounts to 0.9° K. Accordingly, if the reverse bias voltage is 1 v., $\Delta t$ is calculated from Equation 6 as follows:

$$\Delta t=t_0\cdot\frac{v}{V_0}\simeq0.9\times\frac{1}{0.5}\simeq1.8\,(°\text{K.})$$

Further, it should be noted that the smaller Q is, the greater $\Delta t$ becomes.

In order to constitute a switching element with such a metal-semiconductor phase transition material using the movement of the boundary between the metallic and semiconductive phases, the following requirements have to be satisfied.

(i) The temperature T of the element be in such a relation that $T_c>T>T_c-t_{max}$, where $T_c$ is the original metal-semiconductor phase transition temperature of the element and $t_{max}$ is a temperature drop in the transition temperature when a maximum reverse bias voltage is applied to the element. This requirement is necessary for constantly maintaining one end of the element in a metallic phase state and the other one end of the element in a semiconductive phase state.

(ii) The boundary between the semiconductive and metallic phases be a single boundary layer. For this purpose, the element has to be given either a temperature gradient or an impurity concentration gradient.

Furthermore, since the switching operation of the element is based upon the running motion of the boundary which does not at all have to do with the absorption and emission of the latent heat and is performed at a velocity comparable with that of sound even when a lattice distortion is caused with the running motion, the switching time of the element is a ratio of the length of the element to the sound velocity which is, for example, $$\frac{3\times10^{-4}\text{m.}}{3\times10^3\ (\text{m./sec.})}=10^{-7}\ (\text{sec.})$$

Thus, the switching time is extremely short as compared with that of the conventional switching device in which a thermal change is given to a switching element.

EXAMPLE 1

Figure 4A:
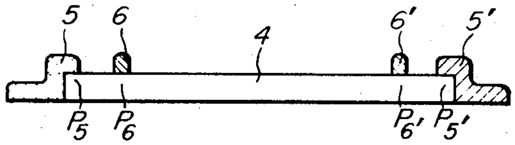
FIGS. 4(*a*) and 4(*b*) are a side view and a plan view of a solid-state switching device in accordance with the present invention.
Figure 4B:
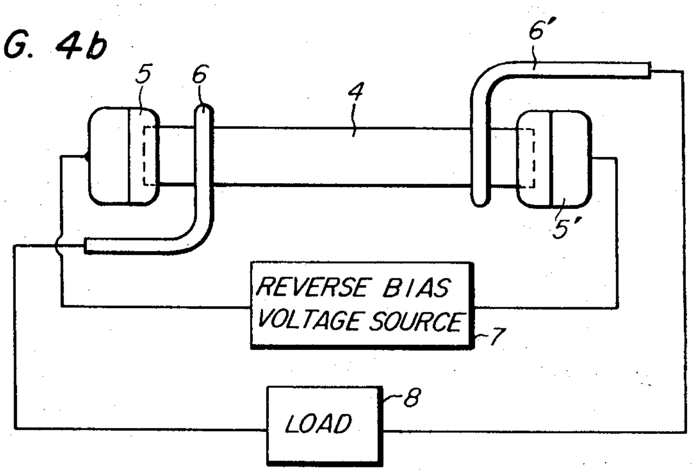
Figure 5:
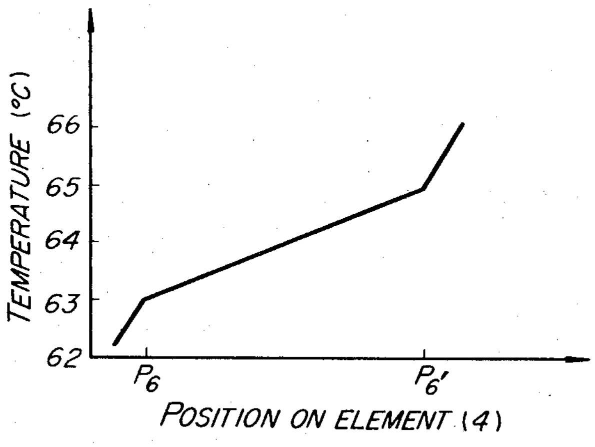
FIG. 5 is a diagram illustrating a temperature gradient given to a first order phase transition element in its longitudinal direction.
Figures 6, 7:
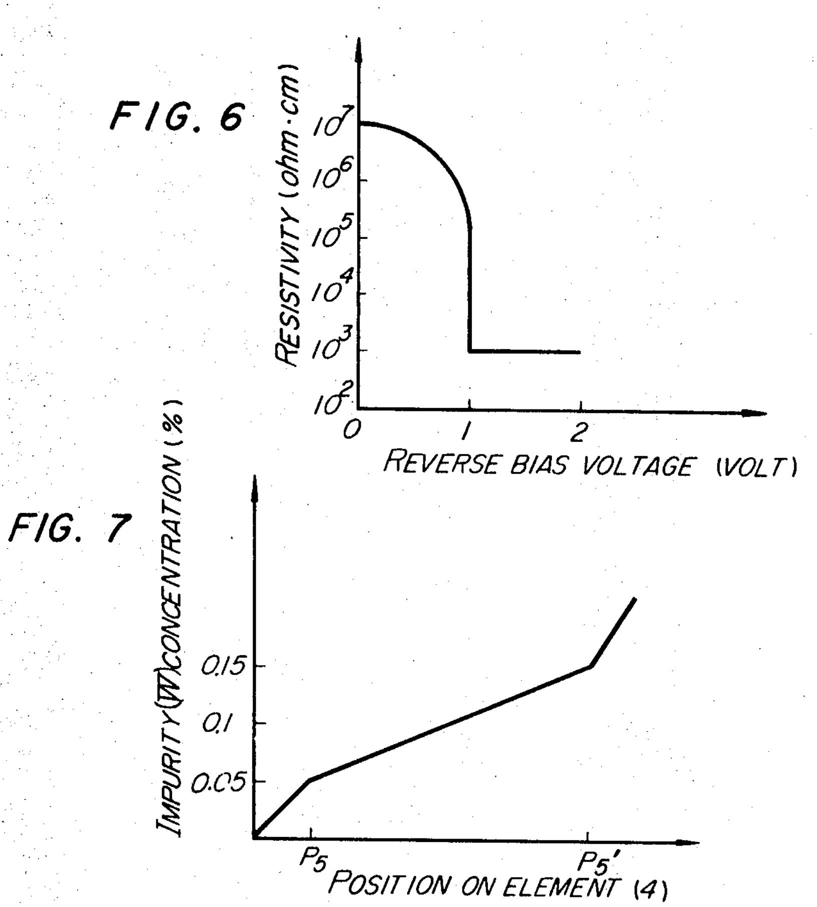
FIG. 6 is a characteristic diagram of the solid-state switching device in accordance with the present invention, showing a relation between the applied reverse bias voltage and the resistivity of the element of FIG. 4 which has been given such a temperature gradient as illustrated in FIG. 5.
FIG. 7 is a diagram illustrating an impurity concentration gradient given to such an element as shown in FIG. 5 between two opposed positions on the element.

As illustrated in FIGS. 4(*a*) and 4(*b*), a switching element 4 is prepared by shaping a single crystal element of $VO_2$ so as to be 7 mm. long, 50$\mu$ wide and 10$\mu$ thick. The element 4 has the following properties: the temperature $T_c$ of the metal-semiconductor boundary is 65° C. when no electric field is applied, the resistivity of the semiconductive phase is $10^2$ Ω·cm. (at 66° C.), the resistivity of the metallic phase is $10^{-2}$ Ω·cm. (at 66° C.), and the carrier concentration is $3\times10^{18}$ cm.$^{-3}$. To the opposite ends $P_5$ and $P_5'$ are attached reverse bias eletcrodes 5 and 5' across which a reverse bias voltage source 7 is connected while at positions $P_6$ and $P_6'$ are placed output electrodes 6 and 6' across which a load 8 is connected. Then, the positions 5 and 5' on the element 4 are maintained at 62° C. and 66° C. respectively, so that a temperature gradient as shown in FIG. 5 is established through the element 4. When a reverse bias voltage is applied from the source 7 to the element 4 through the reverse bias electrodes 5 and 5', the metal-semiconductor boundary in the element 4 runs to move so that the element has a lower phase transition temperature. With an increase of the applied reverse voltage the resistivity of the element varies along the curve as shown in FIG. 6. As is clear from the curve there, when the reverse bias voltages becomes 1 volt, the resistivity of the element reaches a minimum, so that the element is turned to be "on" from "off." The electrodes 5 and 5' are made by first coating the end portions 5 and 5' of the element 4 with In-Ga material and then forming an Sn alloy thereon.

EXAMPLE 2

Figure 8:
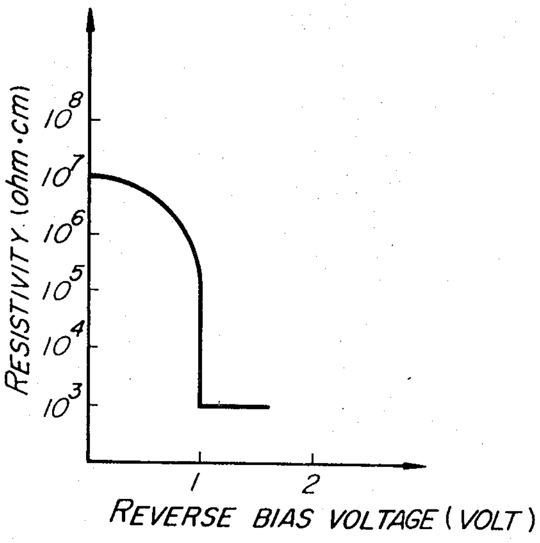
FIG. 8 is another characteristic diagram of the solid-state switching device in accordance with the present invention, showing a relation between the applied reverse bias voltage and the resistivity of the element of FIG. 4 which has been given such an impurity concentration gradient as illustrated in FIG. 7.

Use is made of the same arrangement as Example 1 with the execption that instead of the temperature gradient an impurity concentration gradient is given to the element 4 using tungsten in such a manner that the impurity concentration is high at the electrode 5 side (0.05 weight percent, for example) and is low at the electrode 5' side, thus the distribution of the impurity being such as shown in FIG. 7. The element 4 is maintained uniformly at 62° C. With an increase of the applied reverse bias voltage the resistivity of the element varies along the curve as shown in FIG. 8, and when the reverse voltage becomes 1 volt, the resistivity reaches a minimum, so that the element is turned to be "on" from "off." The used $VO_2$ material including tungsten as an impurity has a transition temperature of 64° C. when the impurity concentration is in the order of 0.05% but by increasing the impurity concentration to, for example, 0.15%, the transition temperature is shifted to 62° C.

In the solid-state switching device of the present invention, since the switching operation owes to the running motion of the boundary at the phase transition which does not have to do with the absorption and emission of the latent heat and which is performed nearly as fast as at the sound velocity even when a lattice distortion is caused in the switching element, satisfying the following inequation $$\left(Q+\frac{1}{2}KE^2\right)/C_P<\Delta t=\frac{1}{2}KE_0^3\cdot T_0V_m\cdot\frac{v}{V_0} \qquad (7)$$

where $C_P$ represents the specific heat at constant pressure of the semiconductor element, it can be well understood that the switching speed is much improved as compared with that of the conventional device and the power necessary for driving the solid-state switching device is very small.

I claim:

1. A solid-state switching device comprising a switching element composed of a metal-semiconductor phase transition material, at least a pair of bias electrodes spaced apart from each other on said switching element, means for conditioning said element so as to consist of a semiconductive phase region and a metallic phase region separated by a first order metal-semiconductor phase transition boundary region in a predetermined temperature state, at least a pair of output electrodes positioned between said pair of bias electrodes and on opposite sides of said boundary region, and means for applying a reverse bias voltage to said element through said pair of bias electrodes.

2. A solid-state switching device as defined in claim 1, wherein said metal-semiconductor phase transition material is selected from the group consisting of VO, $V_2O_3$, $VO_2$ and $TiO_3$.

3. A solid-state switching device as defined in claim 1, wherein said conditioning means is means for giving a temperature gradient to said element in its longitudinal direction.

4. A method for controlling a solid-state switching device having a switching element of a metal-semiconductor phase transition material, the method comprising maintaining said element in a predetermined temperature state, conditioning said element so as to consist of a semiconductive phase region and a metallic phase region separated by a boundary region, and applying a reverse bias voltage to said element to move said boundary region to make one of said phase regions predominant whereby the device performs a switching operation between "on" and "off" states.

5. A method for controlling a solid-state switching device as defined in claim 4, wherein the conditioning of said element is effected by giving to said element an impurity concentration gradient along its longitudinal direction.

References Cited

UNITED STATES PATENTS 3,402,131 9/1968 Futaki et al. -------- 317—234

JERRY D. CRAIG, Primary Examiner

U.S. Cl. X.R.

307—299, 310; 338—22